(12) United States Patent
Hwang et al.

(10) Patent No.: US 11,806,819 B2
(45) Date of Patent: Nov. 7, 2023

(54) FIXTURE FOR LASER ENGRAVING LONG HEAVY OBJECTS

(71) Applicant: SuperNova International Inc., Lansing, MI (US)

(72) Inventors: Chan Hwang, Haslett, MI (US); Adam Childress, Caledonia, MI (US); Samuel McAlvey, Lansing, MI (US)

(73) Assignee: SuperNova International Inc., Lansing, MI (US)

( * ) Notice: Subject to any disclaimer, the term of this patent is extended or adjusted under 35 U.S.C. 154(b) by 583 days.

(21) Appl. No.: 17/089,427

(22) Filed: Nov. 4, 2020

(65) Prior Publication Data

US 2021/0387293 A1 Dec. 16, 2021

Related U.S. Application Data

(60) Provisional application No. 63/039,204, filed on Jun. 15, 2020.

(51) Int. Cl.
*B23K 37/04* (2006.01)
*B23K 26/08* (2014.01)

(52) U.S. Cl.
CPC ...... *B23K 37/0452* (2013.01); *B23K 26/0869* (2013.01)

(58) Field of Classification Search
CPC ...... B23K 37/0538; B23Q 1/76; B23Q 1/766; B23Q 3/105; B41P 2217/62; B65C 9/04; B65C 9/045; F16M 11/2028
See application file for complete search history.

(56) References Cited

U.S. PATENT DOCUMENTS

| 8,309,881 | B2 | 11/2012 | Li |
| 10,654,127 | B2 | 5/2020 | Li |
| 2016/0121437 | A1* | 5/2016 | Berglund ............. B23K 26/361 269/55 |

* cited by examiner

*Primary Examiner* — Tyrone V Hall, Jr.
(74) *Attorney, Agent, or Firm* — Young Basile Hanlon & MacFarlane, P.C.

(57) ABSTRACT

An engraving fixture for use with an engraver including a laser moveable along a linear X-axis path wherein the fixture comprises a base structure having two mutually extendable parts to assume different axial lengths thereby to accommodate objects of different lengths. The base can accommodate at an axial mid-point an auxiliary support for especially heavy objects. The base structure includes a support structure carrying the drive wheels and a stepper motor at one end, and a slidable passive support that can be placed at any location on the base member.

7 Claims, 4 Drawing Sheets

FIXTURE FOR LASER ENGRAVING LONG HEAVY OBJECTS

CROSS-REFERENCE TO RELATED APPLICATIONS

This application claims the benefit of U.S. Provisional Application Ser. No. 63/039,204, filed on Jun. 15, 2020, the entire contents of which is incorporated herein by reference.

FIELD OF THE INVENTION

This document describes a fixture for holding and rotating parts in an engraving machine having an engraving tool capable of programmed digital movement along a horizontal X-axis and, more particularly, to a fixture having the capability of accommodating long and/or heavy objects such as baseball bats, gun barrels, and heavy objects made of materials such as stone and ceramics.

BACKGROUND OF THE INVENTION

It is known to use mechanical cutters and lasers to engrave data, messages, and images on flat objects such as grave markers and curved or cylindrical objects such as glass or ceramic mugs. For cylindrical objects, the engravers use a single X-axis tool movement and rotate the objects incrementally between tool scans to fill out a two-dimensional message or image.

SUMMARY OF THE DISCLOSURE

The present disclosure relates primarily to an object holder fixture for use in combination with an engraving machine having an X-axis tool such as a cutter or a laser and providing the capability of accommodating both smaller and longer articles as well as heavy objects such as baseball bats, gun barrels, and stone objects that are especially heavy, with simple and easily made adjustments.

Also described herein is a system for stabilizing objects mounted on the support structures, including elements at both ends of an object; i.e., on or associated with both the drive and idler structures, to prevent axial movement of an object during an engraving process. Stabilizers include adjustable elements that contact the ends of cylindrical objects at the centers of rotation to prevent axial movement but allow for rotation.

In addition, the fixture may include an optional auxiliary support in the form of a scissor jack slidably mounted to the base track between the support structures to accommodate and provide support for an especially heavy and/or extra-long objects.

DETAILED DESCRIPTION OF THE PREFERRED EMBODIMENT

Figure 1:
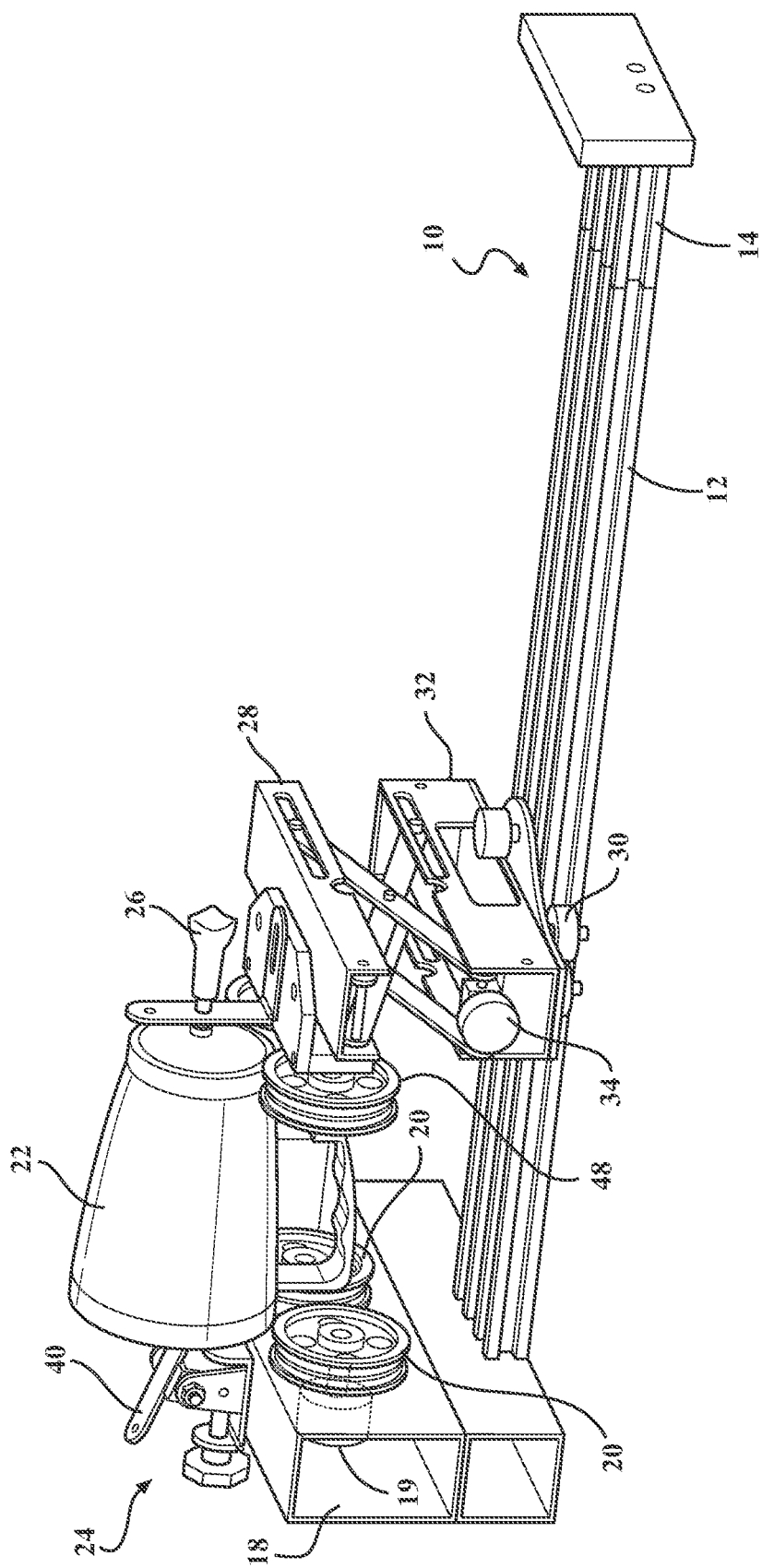
FIG. 1 is a perspective view of a fixture with a drive structure and a scissor jack idler structure in place on a length-adjustable base track having two parts.

Referring first to FIGS. 1-4, the engraving fixture shown therein is, as briefly described above, designed to be placed on the floor of an engraver machine housing beneath and in axial alignment with a programmable engraving tool such as a rotatory cutter or laser. The fixture here described is designed to accommodate objects of various lengths and weights including objects which are especially heavy and/or especially long. In all cases, the objects are "cylindrical" which shall be interpreted to include straight sided cylindrical objects as well as objects having tapers and/or other changes in diameter.

The fixture comprises an extruded aluminum base track member 10 which is generally rectangular with longitudinal grooves to act as a slide track. The base track 10 includes a first longer part 12 and second shorter extension part 14, the two parts being co-axially connected by means of a pair of steel rods such that the part 14 can be moved into abutting relationship with the first part and/or extended away from the first part 12 to increase the length of the track to accommodate longer objects. Whether extended or abutting, the track parts lie in the same plane.

A drive module 18 is hereinafter denoted as a first support module, containing a stepper motor 19 mounted in a fixed position on the left end of base member 10. The drive module 18 includes a pair of side-by-side drive wheels 20 with parallel axes of rotation interconnected with the stepper motor 19 so that the wheels 20 can be rotated in an incremental and previously programmed fashion. Incremental rotation of the drive wheels 20 and the supported object 22 is necessary to accommodate repeated scans of the engraving tool to create a two-dimensional image on the object in a known fashion.

The object 22 is shown in FIG. 1 cradled at its right end on a position-variable support structure 28 in the form of a scissor jack having passive idler wheels 48. Height adjustment to accommodate objects of different diameters and/or tapers is provided by way of the hand knob 34 which is also connected to a threaded shaft in conventional fashion.

Figure 2:
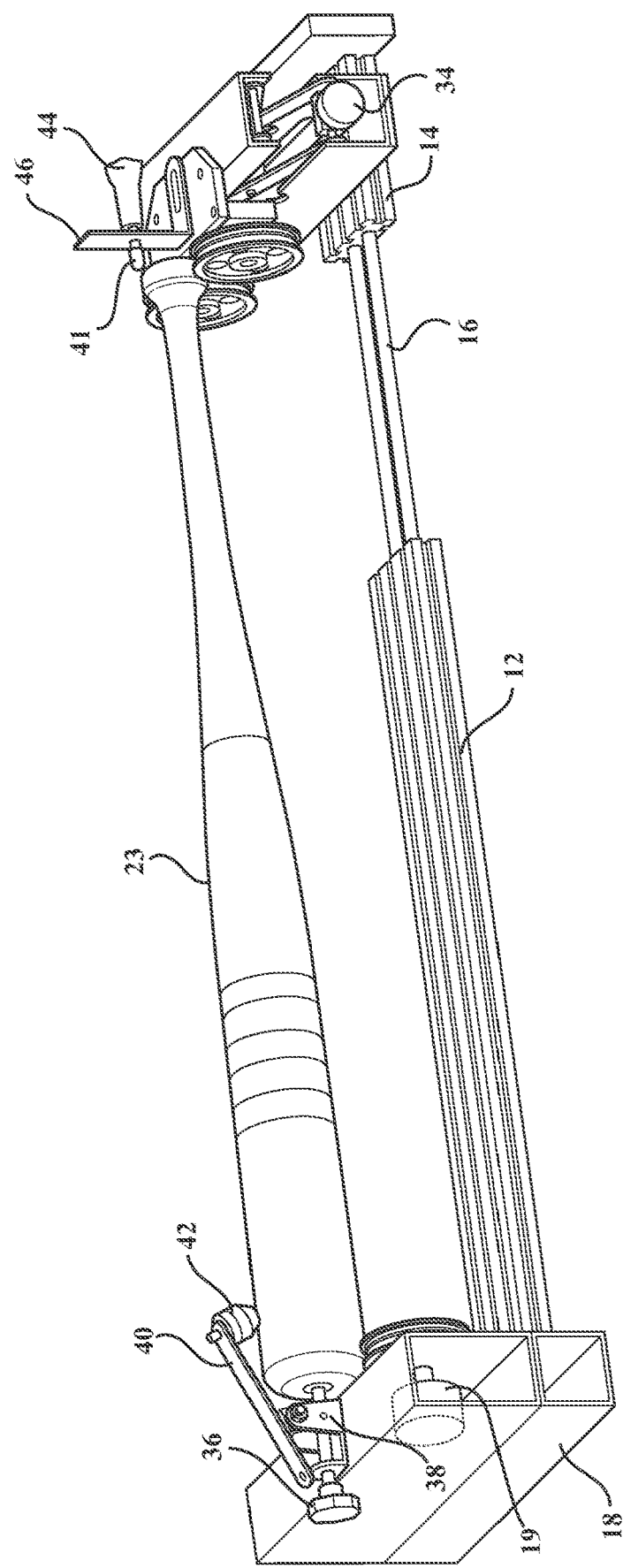
FIG. 2 is a perspective view of the fixture of FIG. 1 with the base track extended to receive a baseball bat.
Figure 3:
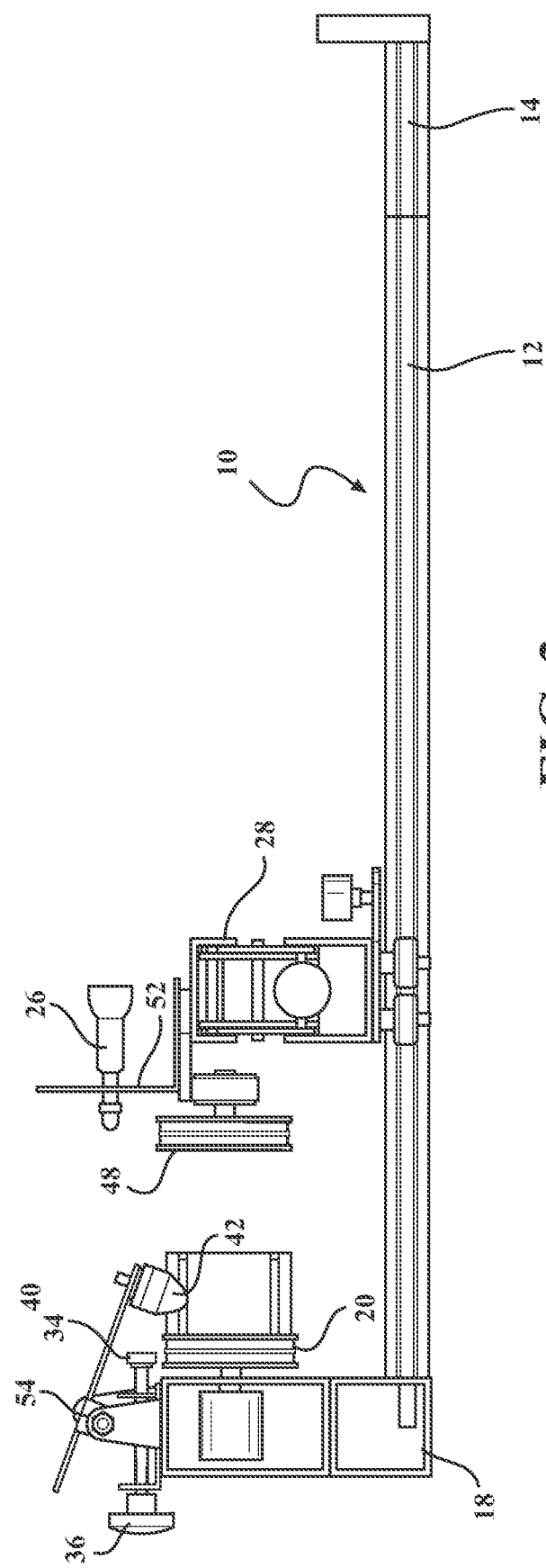
FIG. 3 is a side view of the fixture of FIGS. 1 and 2 with the base track closed to minimum length and showing the stabilizers to hold an object in place.
Figure 4:
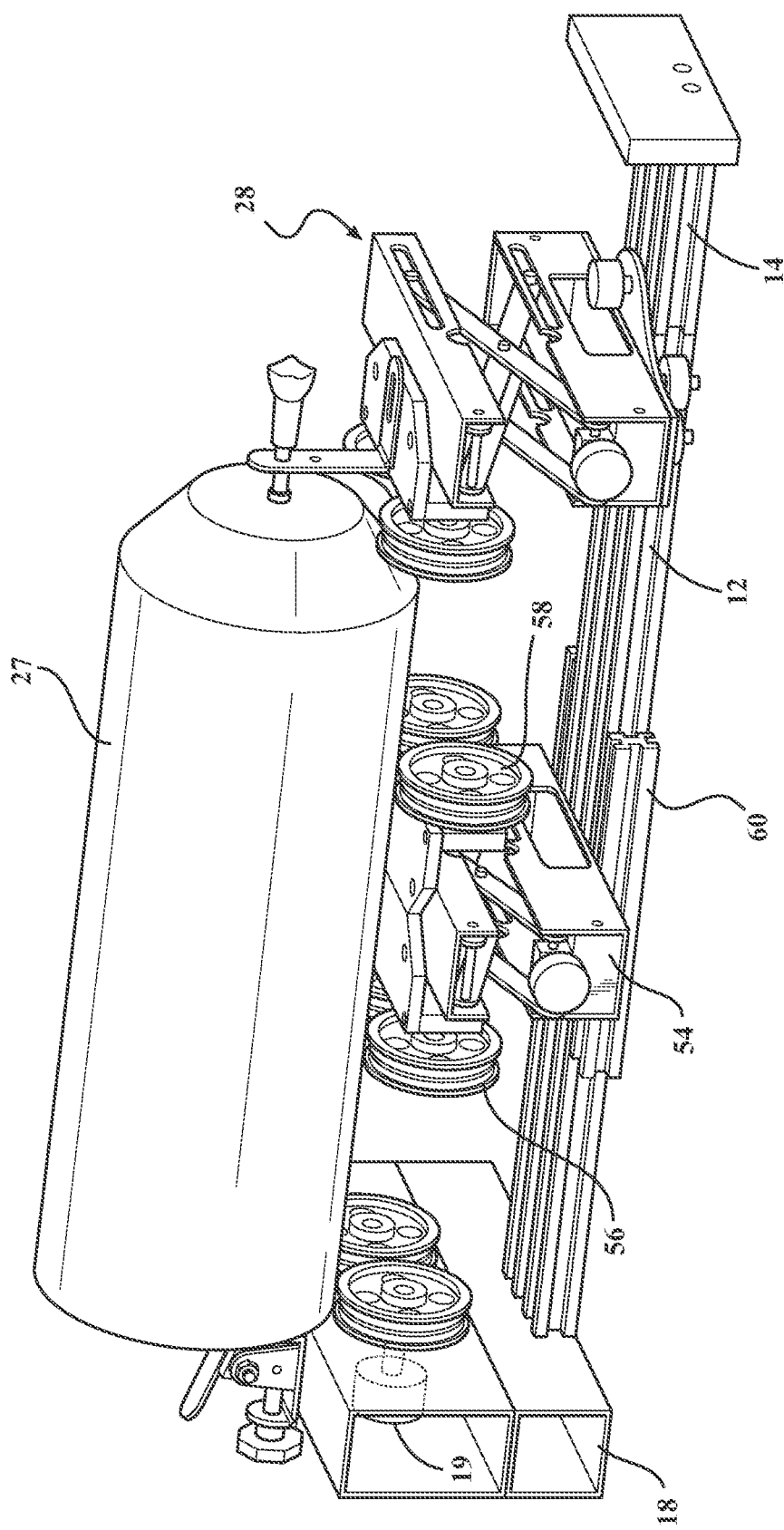
FIG. 4 is a perspective view of the fixture with an especially heavy object in place and with an intermediate scissor jack slidably mounted on the base track member.

Referring now to FIGS. 2-4, the drive module 18 is provided with a set of stabilizers including a stopper 35 on an axial screw 36 which extends through a bracket 38 and has a ball 39 on the end, as shown in FIG. 3, to contact the left axial center of a baseball bat 23 mounted on the drive wheels 24 for rotation. The ball contact 39 allows rotation of the object but prevents it from moving axially toward the drive wheels.

In addition, the structure 18 comprises a second stabilizer element in the form of a spring loaded lever 40 mounted on a bracket 38 and spring biased downwardly to cause a Nylon ball 42 to engage a circumferential surface of the bat 23 near the left end to prevent the bat from lifting off of the drive wheels 20 during incremental rotation.

At the opposite end of the bat, here, the right end as viewed in the drawings, the scissor jack support structure 28 is provided with a second axial stopper 41 having a handle 44 which screws into a plate 46 to allow a Nylon contact element to seat against the right center of the bat 23. Together, the devices 35 and 41 prevent the bat from moving axially relative to the drive wheels 20 during an engraving process.

FIG. 3 shows all of the mechanisms described above in greater detail but with no engravable object or article in place and with the support structurers 18 and 28 located close together for simplicity. The spring arm 40 has a flange 54 in the bracket 38.

FIG. 4 shows the fixture of FIGS. 2 and 3 with scissor jack structure 54 mounted on the base track 10 at a midpoint between the structures 18 and 28 to add additional support for an especially heavy object 27, here a granite vase. The scissor jack structure 54 is similar to the scissor jack 28 except that it has two pairs of passive parallel axis idler wheels 52 and 58, one on the left side and the other on the right side of the structure. A base slide 60 is also provided so that the structure can be moved along the track and on either of the left and right interconnected parts as necessary.

It is to be understood that the various aspects of the subject matter described herein have been described in detail with reference to illustrative embodiments using mechanical components that have various equivalents and various modification, additions and deletions to the structures illustrated herein can be made and will be apparent to persons skilled in the mechanical arts without departing from the primary objectives and advantages of the innovations described herein.

What is claimed:

1. An engraving fixture for use in combination with an engraving machine of the type having a tool movable along a linear path to engrave an object wherein said fixture comprises:
    an elongate base member adapted to be located in parallel relationship with an axis of tool movement;
    a first support structure fixed to one end of said base member and carrying a pair of rotatable drive wheels to receive an object thereon;
    a driver for incrementally rotating said drive wheels to rotate said object between multiple passes of said engraving tool;
    a second support structure carrying idler wheels, said second support structure being slidably mounted on said base for receiving and supporting an object thereon in combination with the first support structure; and
    means for adjusting the distance between the first and second support structures thereby to adjust the length of the base member.

2. The engraving fixture described in claim 1 further including means for engaging the opposite ends of an object cradled on said first and second support structures to axially stabilize said object during an engraving operation.

3. A fixture as defined in claim 1 further including a spring-loaded hold down lever mounted to said drive structure and engaging a surface of said object to hold said object against said drive wheels during incremental rotation thereof.

4. A fixture as defined in claim 3 further including a slotted stepper motor drive pinion and a continuous slotted drive belt operatively arranged between said pinion and the outer circumferences of said drive wheels to serve as traction device between said drive wheels and said object during incremental rotation thereof.

5. An engraving fixture for accommodating long objects comprising:
    a base member having first and second coaxially, coplanar parts slidably interconnected with one another for extension to various overall lengths;
    a drive structure mounted on the first part and including means for rotatably supporting a cylindrical object thereon; and
    a second structure slidably mounted on the base member in axially spaced relationship to the drive structure and including passive means for rotatably supporting said objects thereon.

6. The engraving fixture described in claim 5 further including means for axially and radially stabilizing objects on said drive structure and said second structure.

7. A fixture as described in claim 1 wherein the tool is a laser.

* * * * *